United States Patent [19]
Ty et al.

[11] Patent Number: 5,144,815
[45] Date of Patent: Sep. 8, 1992

[54] THERMAL VALVE FOR COMPRESSOR

[75] Inventors: Henry Ty, Attleboro; Richard J. Lisauskas, Wrentham, both of Mass.; Matthew L. Behler, Merrimack, N.H.; Narendra R. Zaveri, Attleboro Falls, Mass.

[73] Assignee: Texas Instruments Incorporated, Dallas, Tex.

[21] Appl. No.: 671,608

[22] Filed: Mar. 19, 1991

Related U.S. Application Data

[63] Continuation-in-part of Ser. No. 427,163, Oct. 24, 1989, abandoned.

[51] Int. Cl.[5] ............... F25B 31/00; F04B 39/02
[52] U.S. Cl. ............... 62/196.1; 62/505; 236/93 R; 310/53; 417/368
[58] Field of Search ............ 62/505, 196.1; 417/368; 236/93 R; 310/53

[56] References Cited
U.S. PATENT DOCUMENTS

| | | | |
|---|---|---|---|
| 288,622 | 11/1883 | Copeland | 236/101 DX |
| 2,202,411 | 5/1940 | Waterman | 236/101 DX |
| 2,776,542 | 1/1957 | Cooper | 62/505 DX |
| 2,780,738 | 2/1957 | Else | 62/505 UX |
| 2,979,917 | 4/1961 | Meagher | 62/505 DX |
| 3,318,524 | 5/1967 | Kehm | 236/101 DX |
| 4,543,941 | 10/1985 | Newell | 236/101 DX |
| 4,726,452 | 2/1988 | Ty et al. | 236/101 DX |
| 4,783,000 | 11/1988 | Ty | 236/101 DX |

FOREIGN PATENT DOCUMENTS 1441881  7/1976  United Kingdom ............... 62/505

*Primary Examiner*—William E. Wayner
*Attorney, Agent, or Firm*—Russell E. Baumann; Rene' E. Grossman; Richard L. Donaldson

[57] ABSTRACT

A temperature control system and a thermal valve for said system composed of a housing having a gas inlet port connected to the refrigerant return line and a gas outlet port disposed in a compressor interior. A helical thermostat metal coil is fixed within and at one end of the housing, the other end of the coil being free to rotate with change in temperature. The thermostat metal for the coil is preferably chosen so that no movement thereof takes place until some predetermined temperature is reached, at which temperature rotation of the free coil end commences. The free coil end, either along or in conjunction with a baffle or the like, normally blocks the gas inlet port and prevents refrigerant gas from entering the housing and passing therethrough onto the compressor motor. When the motor within the compressor heats up to the predetermined temperature, the thermostat metal helical coil proceeds to rotate and moves the end thereof or baffle attached to the end thereof away from the gas inlet port and permits refrigerant gas to enter the housing and pass therethrough to cool the motor therein. When the motor within the compressor is cooled below the predetermined temperature, the thermostat metal coil will have rotated in the opposite direction to again close off the fluid inlet port. In this way, the refrigerant gas is applied to the compressor motor only under conditions of overheating.

11 Claims, 2 Drawing Sheets

THERMAL VALVE FOR COMPRESSOR

This application is a continuation-in-part of Ser. No. 07/427, filed Oct. 24, 1989, now abandoned.

BACKGROUND OF THE INVENTION

1. Field of the Invention

This invention relates to a thermal vale and, more specifically, to a valve for use primarily in compressor interiors responsive to temperature within the compressor.

2. Brief Description of the Prior Art

The art is constantly attempting to improve the efficiency of compressors in refrigeration applications in order to provide the concomitant saving in energy cost. One application to provide this desired result has been to flow return refrigerant gas from the evaporating system over the compressor motor to keep the motor cool and at a temperature at which it operates at maximum efficiency and also to prevent the motor from running too hot and at temperatures at which the motor efficiency decreases. However, during such motor cooling operations, the motor is often being cooled when it is not overheated and does not require cooling. This can lead to motor operation out of its most efficient operating temperature range and again provide a decrease in efficiency. It is therefore desirable to block off the return refrigerant gas from the evaporating system to the motor when the motor is not overheated to improve motor efficiency and save energy. It is therefore desirable that the movement of cooling gases over the motor be stopped when the motor is operating at normal or below normal temperatures and that the cooling gases only be applied to the motor when the motor is actually operating at temperatures above its most efficient operating temperature range.

SUMMARY OF THE INVENTION

The above desired motor operation is provided by locating a thermal valve on or immediately adjacent the motor within the compressor. The thermal valve is disposed at the end of a refrigerant return line to the compression chamber within the compressor which is a branch of the line between the evaporator and the compressor. The branch travels from the refrigerant return line to the compressor through the thermal valve. The valve is designed to open when the motor temperature within the valve is designed to open when the motor temperature within the compressor is above a predetermined level and diverts some of the refrigerant gases in the refrigerant return line to cool the motor therein. At other times, the thermal valve is closed and prevents refrigerant gases from being diverted to the motor. Return gas always flows into the compressor and compression chamber with some of the return gas being diverted to the motor as noted above only during overheating of the motor.

Briefly, in accordance with the present invention, there is provided a temperature control system and a thermal valve for use in the temperature control system which is composed of a casing or housing having a gas inlet port connected to the refrigerant return line and a gas outlet port disposed in the compressor interior which contains the motor. Within the housing is a helical thermostat metal coil which is fixed within the housing at one end thereof, the other end of the coil being free to rotate with change in temperature. The thermostat metal for the coil is preferably assembled so that no movement thereof takes place until some predetermined temperature is reached, at which temperature rotation of the free coil end commences. Thermostat metal elements of this type are well known in the art and require no further explanation.

The free coil end, preferably in conjunction with a baffle or the like, normally blocks refrigerant gas from entering the housing which contains the motor. When the motor within the compressor heats up to the predetermined temperature, the thermostat metal helical coil proceeds to rotate and moves the baffle attached to the end thereof away from the gas inlet port and permits refrigerant gas to enter the housing and pass therethrough to cool the motor adjacent thereto. When the motor within the compressor is cooled below the predetermined temperature, the thermostat metal coil will rotate in the opposite direction to again close off the fluid inlet port. In this way, the refrigerant gas is applied to the compressor motor only under conditions of overheating, thereby permitting the motor to operate at normal rather than reduced temperature during normal operation and increasing efficiency.

DESCRIPTION OF THE PREFERRED EMBODIMENT

Figure 1:
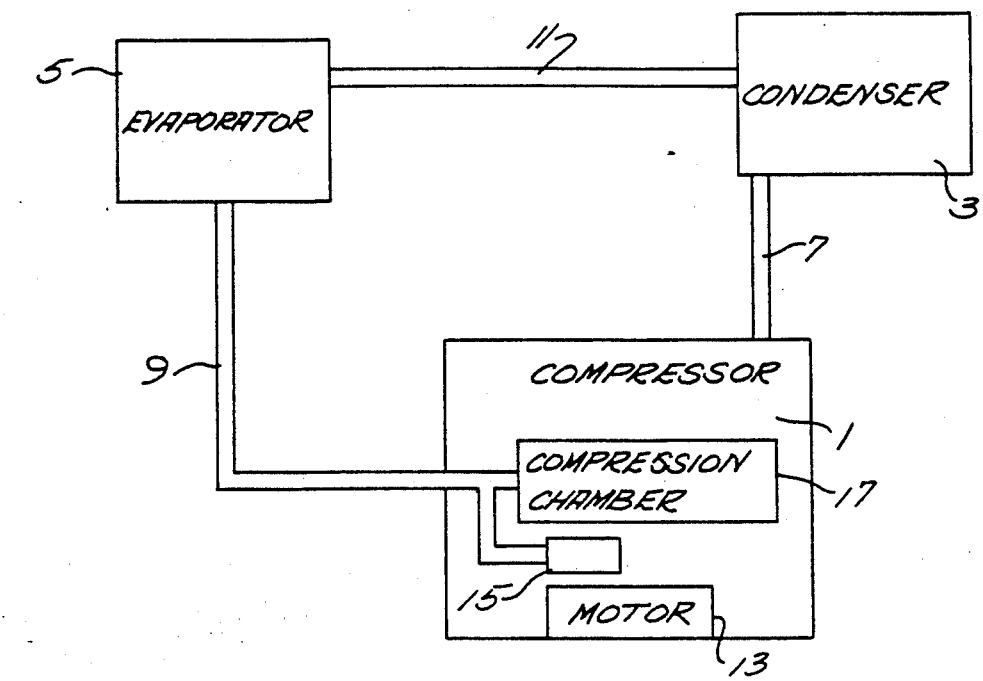
FIG. 1 is a schematic diagram of a refrigeration system for use in conjunction with the thermal valve in accordance with the present invention.
Figure 2:
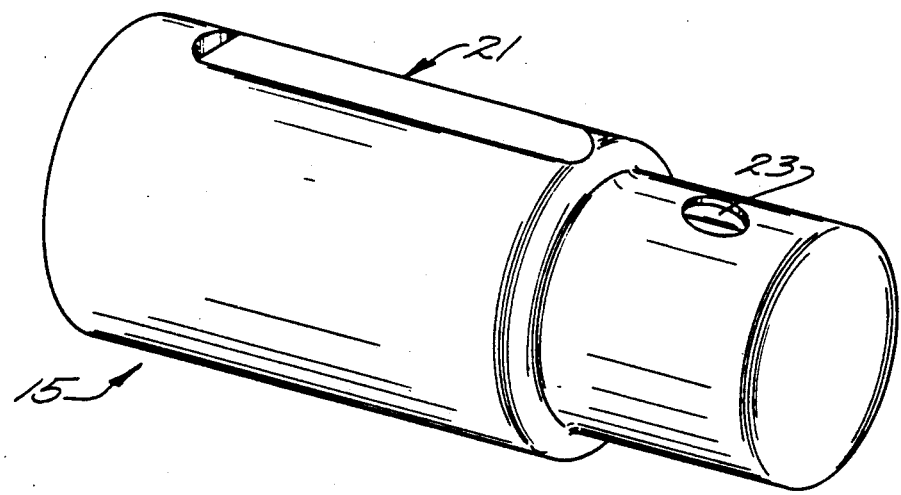
FIG. 2 is a perspective view of the housing portion of the thermal valve in accordance with the present invention.

Referring first to FIG. 1, there is shown a standard refrigeration system including a compressor 1, a condenser 3 and an evaporator 5. A line 7 transmits refrigerant from the compressor 1 to the condenser 3, a line 11 transmits refrigerant from the condenser 3 to the evaporator 5 and a line 9 transmits refrigerant from the evaporator 5 to the compressor 1.

The compressor 1 includes a compression chamber 17, a motor 13 and a thermal valve disposed within the compressor 1 and secured therein. The thermal valve 15 is disposed on or closely adjacent to the motor 13 in the compressor 1, is responsive to the temperature of the motor and opens at a predetermined sensed temperature of the motor housing to permit refrigerated fluid from line 9 to enter the interior of the compressor 1 containing the motor 13 to cool the motor. The above described structure except for the combination thereof with the thermal valve and the valve, as will be described hereinbelow, is prior art and requires no further explanation herein.

Referring now to FIGS. 2-5, there is shown the housing 21 of the thermal valve 15 in accordance with the present invention, the remainder of the thermal valve being disposed within the housing. The housing 21 includes an inlet port 23 which is coupled to the return line 9 and through which a portion of the refrigerated fluid from the line 9 to the compressor 1 travels when the valve is open. Also present (shown in FIG. 4) is an outlet port 25 similar to the port 23 through which the refrigerated fluid entering the thermal valve 15 passes to the interior of the compressor 1. A plastic wall 27 within the housing 21 isolates the coil therein from the gas and prevents the gas from flowing onto the coil.

Figure 3:
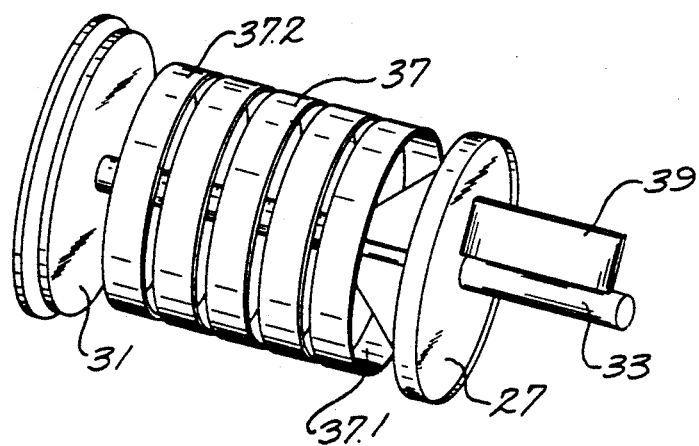
FIG. 3 is a perspective view of the interior elements of the thermal valve in accordance with the present invention.
Figure 4:
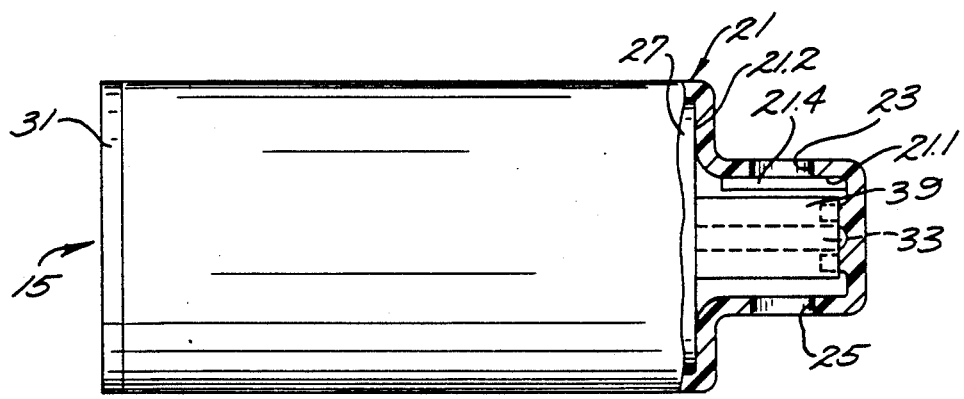
FIG. 4 is a front elevational view of FIG. 2 with a portion of the housing broken away showing details of a rotatable wall from which a baffle extends along a wall of the housing.
Figure 5:
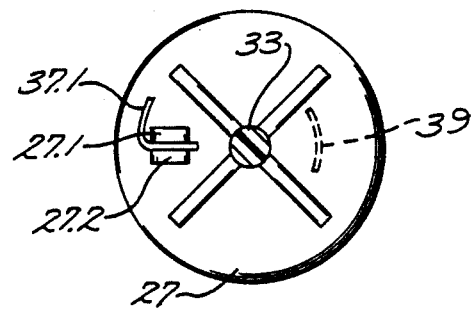
FIG. 5 is a left side view of the rotatable wall with reference to FIG. 4.

Referring to FIG. 3, there is shown the interior of the thermal valve 15 with the housing 21 removed. The valve 15 includes a bracket 31 which is adapted to be secured to an interior wall of the compressor 1, the bracket also being secured to the housing 21 to provide a seal therewith. The bracket 31 also supports one end of a shaft 33 therein, the other end of the shaft 33 being secured to the housing 21. The shaft 33 is fixed in at least one of the bracket 31 and housing 21 against rotation. A helical coil 37, formed of thermostat metal material, is secured at one coil end 37.1 to rotatable plate 27, as for example, by inserting the coil end 37.1 between blocks 27.1, 27.2 and at its opposite end 37.2 to bracket 31 in any suitable manner as by inserting that end between blocks provided in bracket 31 (not shown) similar to 27.1, 27.2. Coil 37 is wrapped around and spaced from shaft 33. Arcuately, shaped baffle 39 extends outwardly from wall 27 and extends along the interior cylindrical wall portion 21.1 and has a radius similar to that of cylindrical wall portion 21.1. Rotatable wall 27 has an outer peripheral portion which is disposed contiguous with radially extending annular wall portion 21.2 to define a valve chamber having an inlet 23, an outlet 25 and a baffle 39 adapted to slide along the side wall portion 21.1 into and out of alignment with inlet port 23. As mentioned above, wall 27 forms a barrier to isolate the refrigerated fluid from coil 37. A rib 21.4 projecting from wall 21.1 into the valve chamber adjacent port 23 can be provided, if desired, to serve as a stop member to limit angular motion of baffle 39. In operation, under normal conditions baffle 39 is in alignment with inlet port 23 to close or block flow of refrigerant therethrough.

Since the entire housing 21 which includes coil 37 is disposed in the fluid within the compressor 1 and on or closely adjacent the motor 13, when the temperature within the compressor reaches a predetermined temperature, the coil 37 commences rotation due to the differences in coefficient of thermal expansion of the two metals forming the thermostat metal coil. Since end portion 37.2 is fixed the opposite end 37.1 will rotate with concomitant rotation of plate 27 and movement of baffle 39 away from the inlet port opening 23 to open the port and permit refrigerant to travel through the valve 15 into the compressor. When the temperature within the compressor returns to below the predetermined temperature, the helical coil 37 again rotates and closes the inlet port opening 23.

It can be seen that there has been provided a simple, inexpensive and accurate thermal valve which accurately controls the temperature in the compressor interior by preventing overheating therein.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

We claim:

1. A compressor system having an evaporator, condenser and compressor, a motor disposed in the compressor, a line for transmitting refrigerated fluid from the evaporator to the compressor, a thermal valve means disposed within the compressor coupled to the line and responsive to the temperature of the motor to open at a predetermined sensed temperature of the motor to permit refrigerated fluid to flow through the valve into contact with the motor to cool the motor, the thermal valve means comprising a housing having a fluid inlet port coupled to the line and a fluid outlet port adjacent to the motor, a thermostat metal device secured at one end portion thereof within the housing another end portion of the thermostat metal device coupled to a baffle movably responsive to sensed temperatures of the motor to cause the baffle to move into and out of alignment with the fluid inlet port, the baffle being moved out of alignment with the fluid inlet port when the thermostat metal reaches the predetermined sensed temperature to cause refrigerated fluid to alter the temperature of the motor.

2. A system as set forth in claim 1 wherein the thermostat metal device is a helical coil with the other end portion secured to a movable wall, the wall forming a barrier to isolate the refrigerated fluid from the coil, the baffle extending outwardly from the wall.

3. A system as set forth in claim 2 further including a shaft mounted in the housing, the helical coil having first and second ends, the first end connected to the housing and the second end connected to the movable wall.

4. A system as set forth in claim 3 wherein the coil is wrapped around and spaced from the shaft.

5. A system as set forth in claim 4 in which the movable wall is rotatable.

6. A temperature control system comprising:
   (a) motor means requiring temperature control,
   (b) a thermal valve disposed in close proximity to said means and responsive to the temperature thereat to open at a predetermined sensed temperature of said means to permit refrigerated fluid to flow through the valve into contact with said means, said thermal valve means including:
   (c) a housing having a fluid inlet port; and
   (d) a thermostat metal device secured at one end portion thereof within said housing, the other end portion of said thermostat metal device coupled to a baffle movably responsive to sensed temperatures of said means to cause the baffle to move into and out of alignment with the fluid inlet port, the baffle being moved out of alignment with the fluid inlet port when the thermostat metal reaches the predetermined sensed temperature to cause said fluid to alter the temperature of said means requiring temperature control.

7. A system as set forth in claim 6 wherein the thermostat metal device is a helical coil with the other end portion secured to a movable wall, the wall forming a barrier to isolate the refrigerated fluid from the coil, the baffle extending outwardly from the wall.

8. A system as set forth in claim 7 further including a shaft mounted in the housing, the helical coil having first and second ends, the first end connected to the housing and the second end connected to the movable wall.

9. A system as set forth in claim 8 wherein the coil is wrapped around and spaced from the shaft.

10. A system as set forth in claim 9 in which the movable wall is rotatable.

11. A system as set forth in claim 10 in which the motor is disposed in a compressor.

* * * * *